United States Patent Office 3,188,213
Patented June 8, 1965

3,188,213
TENDERIZING OF FRESH MEATS
William Delaney, Chicago, Ill., assignor to Kadison Laboratories, Inc., Chicago, Ill., a corporation of Delaware
No Drawing. Filed Dec. 15, 1961, Ser. No. 159,774
2 Claims. (Cl. 99—107)

My invention is concerned with a new and useful process for tenderizing fresh or uncured meat (hereafter called "fresh" meat) and to new and useful compositions therefor.

It has long been known in the art to effect the tenderizing of fresh meat, notably beef, steaks and the like, by subjecting the same to contact therewith of proteolytic enzymes such as papain, ficin, bromelin, and the like. Such procedures, while reasonably effective, have a number of disadvantages. One of such disadvantages is the fact that care must be exercised in connection with controlling the extent of tenderization by such proteolytic enzymes since, if the tenderizing process is carried too far, the point may actually be reached where the meat is essentially dissolved much as it would be in the human stomach. Furthermore such tenderization as is effected is commonly non-uniform, varying from over-tenderization on the meat surfaces and inadequate tenderization in the meat interior, depending on the thickness of the meat cut.

My invention is based upon certain discoveries which result in the production of new and useful tenderizing compositions for fresh meats, and processes for effecting the tenderizing of fresh meats with such compositions, and which overcome various of the disadvantages of heretofore known procedures such as have been described above. The practice of my invention makes possible uniform, controlled and effective tenderizing of fresh meats at relatively low costs. Furthermore, my invention makes possible easier control over the tenderizing process so as to avoid even the possibility of over-tenderizing fresh meats to the point where it becomes objectionable. The process of effecting the tenderizing of fresh meats in accordance with my invention is readily adapted for commercial usage on a substantial scale and through simple means readily available to meat processors.

In brief, I have found that fresh meats may be effectively tenderized by subjecting the same to contact with an aqueous solution containing a major proportion of sodium chloride and minor proportions of non-linear phosphates as, for instance, alkali metal pyrophosphates and polyphosphates, and, in addition, a proteolytic enzyme.

The practice of my invention is to be sharply distinguished from practices in the meat industry wherein alkali metal pyrophosphates and polyphosphates have been used, for instance, in the treatment of cured meat products such as hams and bacons and in products such as sausages. In the case of cured, cooked and smoked hams and bacons, the alkali metal pyrophosphates and polphosphates have been employed in order to maintain or impart a desirable meat color and to maintain moisture within the said meats, as shown, for instance, in U.S. Patent No. 2,513,094. In sausage products, the phosphates have been employed, generally speaking, to aid in effecting satisfactory emulsification of the fat constituents of said sausage products. My invention, as stated, has no relationship whatever to the treatment of cured, cooked or smoked meat products and sausage but, on the contrary, is concerned with effecting the tenderizing of fresh meats.

As a result of numerous tests, I have found that the treatment of fresh meat with aqueous solution containing alkali metal pyrophosphates or polyphosphates or other non-linear phosphates, common salt, and small amounts of proteolytic enzyme brings about very substantial tenderization, of relatively even and uniform character throughout the meat and without the tendency of over-tenderization occurring. Moreover, it appears that, in many cases, the amount of proteolytic enzyme necessary to achieve such tenderization in conjunction with the saline solution of the non-linear phosphates is less, and sometimes appreciably less, than the amount of proteolytic enzyme necessary to effect tenderizing as employed in commercial proteolytic enzyme tenderizing compositions heretofore known.

As I have indicated above, simple linear phosphates are not operative in the practice of my invention. Phosphates which are effective in the practice of my invention are particularly the alkali metal pyrophosphates, such as tetrasodium pyrophosphate and tetrapotassium pyrophosphate, and the alkali metal polyphosphates. In general, the phosphates which are operative in the practice of my invention are of the type which are shown in the aforementioned Patent No. 2,513,094, namely, molecularly dehydrated phosphates having a molal ratio of $R_2O$ to $P_2O_5$ not greater than 1.7:1, where R is selected from the group consisting of hydrogen, alkali metal and ammonium. However, while said patent states that, for the purposes of the invention of that patent, pyrophosphates are not effective, they are very distinctively effective for the purposes of my present invention. In those instances where the non-linear phosphates have insufficient solubility in the brine solution for most effective use, that solubility may be increased by the inclusion in the composition of linear phosphates such as monosodium phosphate.

The following examples are illustrative of the practice of my invention. It will be understood, however, that various other compositions can readily be evolved in view of the guiding principles and teachings provided herein.

Example 1

| | |
|---|---|
| Sodium chloride | 93 pounds, 12 ounces. |
| Tetrasodium pyrophosphate | 3 pounds, 12 ounces. |
| Monosodium phosphate | 2 pounds, 8 ounces. |
| Papain | 8.75 ounces. |

The composition of the above example was utilized on the basis of 1 lb., 9½ ounces to 1 gallon of water. The monosodium phosphate was used essentially to aid in effecting solution of the tetrasodium pyrophosphate. The level of the papain in 100 gallons of the finished tenderizing composition, utilizing the composition of Example 1, is approximately 12 to 13 ounces. Fresh meat of utility grade was dipped into the tenderizing solution made as described above in this example, and maintained in said solution, at a temperature of about 45° F., for a period of 45 seconds. The fresh meat, upon removal from the tenderizing solution, was found to have been very effectively tenderized.

Example 2

| | | |
|---|---|---|
| Sodium chloride | pounds | 94 |
| Sodium hexametaphosphate | do | 5 |
| Papain | ounces | 8 |

Example 3

| | | |
|---|---|---|
| Sodium chloride | pounds | 92 |
| Sodium tripolyphosphate | do | 6 |
| Bromelin | ounces | 9 |

Example 4

| | | |
|---|---|---|
| Sodium chloride | pounds | 90 |
| Sodium hexametaphosphate | do | 5 |
| Sodium tripolyphosphate | do | 2 |
| Papain | ounces | 10 |

Example 5

Sodium chloride _____pounds__ 150
Sodium hexametaphosphate _____do____ 10
Papain _____ounces__ 4 to 10
Water to make 100 gallons of solution.

The compositions of Examples 2, 3, 4 and 5 are used in the same manner described in Example 1 or as otherwise described above.

Supplemental ingredients can be added to the dry compositions of my invention or incorporated into the tenderizing solutions such as dextrose and other sugars, spice materials and other flavoring extracts, liquid protein hydrolyzates, and the like, but they are in no way essential to the practice of my invention.

While, as indicated, the proportions of the ingredients utilized in the compositions of my invention are variable, good results are obtained, in general, with compositions containing, in relative amounts by weight, from 75 to 95 pounds of common salt, from 10 to 3 pounds of non-linear phosphates or mixtures of such phosphates, and from ½ ounce, and more advantageously from 4 ounces, to 2 pounds or more of proteolytic enzymes or mixtures of such enzymes. The aforesaid compositions will, in general, be used in the proportion of 8 ounces to 2 pounds per gallon of water. In use, the aqueous solutions, per 100 gallons, may contain from as low as about ½ ounce of proteolytic enzyme up to 16 ounces or more but, most advantageously, from 4 to 10 ounces; and from 5 to 15, preferably from 8 to 12, pounds of non-linear phosphate. The exact concentration of proteolytic enzyme and non-linear phosphate for optimum results will vary dependent upon the particular cut of meat as, for instance, canner-cutter, utility, good or the like. Liquid concentrates of the tenderizing compositions can, if desired, be marketed subject to dilution with water when the compositions are prepared for use.

In certain instances, where it is desired to produce tenderizing solutions having relatively high concentrations of the non-linear phosphates, it may be desirable initially to dissolve said phosphates in the water, and then add the proteolytic enzyme and the salt, instead of adding a dry composition containing all of the ingredients to the water, or instead of adding the non-linear phosphates to a previously prepared salt brine.

The temperature at which the solution is contacted with the fresh meat is advantageously at room temperature or not substantially higher, but it is particularly desirable to use solution lower temperatures, of the order of 38 to 44° F. Dipping, or contact times, for instance spraying or pumping, are variable, but, in general the meat should be kept in contact with the tenderizing solution for periods ranging generally from a few seconds up to several minutes, for instance, 5 to 7 minutes, but the usual practice will involve contact periods of the order of 15, 30, 45 or 60 seconds.

While the invention is especially useful in the tenderizing of beef, particularly utility cuts of beef, it is also useful in tenderizing other fresh meats such as lamb, pork, chicken and other fowl.

What I claim as new and desire to protect by Letters Patent of the United States is:

1. In the tenderizing of fresh meats, the step which comprises subjecting said meats to contact with an aqueous solution, at a temperature in the range of about room temperature to about 44° F. and for a period in the range of several seconds to several minutes, said solution containing from 8 ounces to 2 pounds per gallon of a mixture of (a) sodium chloride, (b) molecularly dehydrated phosphate having a molar ratio of $R_2O$ to $P_2O_5$ not greater than 1.7 to 1, where R is selected from the group consisting of hydrogen, alkali metal and ammonium, and (c) a proteolytic enzyme selected from the group consisting of papain, ficin and bromelin, the aforesaid ingredients being present in proportions to each other of from 75 to 95 pounds of sodium chloride, from 10 to 3 pounds of phosphate, and from ½ ounce to 2 pounds of proteolytic enzyme.

2. A tenderizing composition for use in the tenderizing of fresh meats which comprises a mixture of sodium chloride, molecularly dehydrated phosphate having a molar ratio of $R_2O$ to $P_2O_5$ not greater than 1.7 to 1, where R is selected from the group consisting of hydrogen, alkali metal and ammonium, and a proteolytic enzyme selected from the group consisting of papain, ficin, and bromelin, said ingredients being present in substantially the following proportions in relation to each other:

Sodium chloride _____ 75 to 95 pounds.
Phosphate _____ 10 to 3 pounds.
Proteolytic enzyme _____ 4 ounces to 2 pounds.

References Cited by the Examiner

UNITED STATES PATENTS

| | | | |
|---|---|---|---|
| 2,140,781 | 12/38 | Allen. | |
| 2,471,282 | 5/49 | Paddock. | |
| 2,513,094 | 7/50 | Hall | 99—159 |
| 2,812,262 | 11/57 | Wasserman | 99—159 X |
| 2,999,019 | 9/61 | Hopkins et al. | 99—159 X |
| 3,037,870 | 6/62 | Schleich et al. | 99—159 X |

A. LOUIS MONACELL, *Primary Examiner.*

HYMAN LORD, *Examiner.*